United States Patent [19]

Gage et al.

[11] Patent Number: 4,892,745

[45] Date of Patent: Jan. 9, 1990

[54] TEXTURE EQUILIBRATION IN COOKIES

[75] Inventors: Dennis R. Gage; Martin A. Mishkin, both of Cincinnati, Ohio

[73] Assignee: The Procter & Gamble Co., Cincinnati, Ohio

[21] Appl. No.: 606,727

[22] Filed: May 3, 1984

[51] Int. Cl.$^4$ .................. A21D 13/00; A21D 8/06
[52] U.S. Cl. ............................ 426/549; 426/94; 426/103; 426/497; 426/506; 426/511
[58] Field of Search ............... 426/94, 103, 502, 549, 426/506, 497, 511

[56] References Cited

U.S. PATENT DOCUMENTS

| | | | |
|---|---|---|---|
| 1,355,129 | 10/1920 | Corby | 426/28 |
| 2,801,921 | 8/1957 | Moses | 426/61 |
| 2,975,059 | 3/1961 | Andrews | 426/96 |
| 3,026,205 | 3/1962 | Stone | 426/28 |
| 3,057,730 | 10/1962 | Morck | 426/291 |
| 3,158,486 | 11/1964 | Morck et al. | 426/250 |
| 3,917,856 | 11/1975 | Wong et al. | 426/94 |
| 4,137,336 | 1/1979 | Radlove | 426/555 |
| 4,291,065 | 9/1981 | Zobel et al. | 426/549 |
| 4,344,969 | 8/1982 | Youngquist et al. | 426/18 |
| 4,401,681 | 8/1983 | Dahle | 426/94 |
| 4,455,333 | 6/1984 | Hong et al. | 426/94 |
| 4,503,080 | 3/1985 | Brabbs et al. | 426/94 |

FOREIGN PATENT DOCUMENTS 1090193 11/1980 Canada.
2511847 9/1976 Fed. Rep. of Germany.

OTHER PUBLICATIONS

Glabau, C. A., "Ingredient Changes and Mixing Procedures in Cookie Production", Parts 5, 6, 7, 8, Bakers Weekly, vol. 184, No. 12, pp. 38–40; No. 13, pp. 53–55 (1959); vol. 185, No. 1, pp. 40–42; No. 2, pp. 44–45, 47 (1960).

Matz, S. A. and Matz, T. D., Cookie and Cracker Technology, 2nd Ed., Avi Pub. Co., Inc., Westport, Conn., pp. 36–48, 147–165 (1968).

Yamazaki, W. T., "Laboratory Testing of Flours and Cookie Quality Research", Cereal Science Today, vol. 7, No. 4, pp. 98, 100, 102–102, 125, Apr. (1962).

Yamazaki, W. T., "The Application of Heat in the Testing of Flours for Cookie Quality", Cereal Chemistry, vol. 36, pp. 59–69 (1959).

Brenneis, L. S., "Qualitative Factors in the Evaluation of Cookie Flours", The Bakers Digest, vol. 39, No. 1, pp. 66–69 (1965).

Zabik, M. E., Fierke, S. G. and Bristol, D. K., "Humidity Effects on Textural Characteristics of Sugar-Snap Cookies", Cereal Chemistry, vol. 56, No. 1, pp. 29–33 (1979).

Bean, M. M., and Yamazaki, W. T., "Wheat Starch Gelatinization in Sugar Solutions I Sucrose:Microscopy and Viscosity Effects", Cereal Chemistry, vol. 55, No. 6, pp. 936–944 (1978).

Pyler, E. J., Ed., "Baking Science & Technology", vol. 1, 2, Sibel Publishing Co., Chicago, Ill., pp. 3–45, 396–434, 995–1002 (1982).

(List continued on next page.)

Primary Examiner—Elizabeth C. Weimar
Attorney, Agent, or Firm—R. L. Hemingway; J. P. Filcik; R. C. Witte

[57] ABSTRACT

A process for reducing the time required to achieve texture equilibration in crumb-continuous cookies having distributed therein discrete regions of storage-stable crisp texture and discrete regions of storage-stable chewy texture comprises increasing the rate of sugar crystallization. The rate of sugar crystallization can be increased by exposing the cookies to an exogenous source of moisture, decreasing the level of crystallization-resistant sugar in the outer region of the cookie, decreasing readily crystallizable sugar particle size for a given sugar level, increasing the readily crystallizable sugar to flour ratio, increasing the moisture level in the cookie dough, baking the cookies to have a higher moisture content, or by any combination of these or other equivalent means.

3 Claims, 9 Drawing Sheets

OTHER PUBLICATIONS

Redfern and Hickenbottom, "Levulose-Containing Corn Syrups for the Baker", The Bakers Digest, Apr. 1972, pp. 26–31.

The Fructose Cookbook, M. Cannon, East Woods Press Books, Charlotte, N.C., pp. 101–112 (1979).

Keysers, H., "Differences in Crystallization Rate Between Invert Sugar and High-Fructose Glucose Syrup, and Their Softness Retention Action", Zucker-Und Susswarenwirtschaft, vol. 35, No. 5, pp. 147–148 (1982).

Pancoast, H. M. and Junk, W. R., Handbook of Sugars, 2nd Ed., AVI Publishing Co., Inc., Westport, Conn., pp. 223–232, 257, 271–272, 281, 383–414 (1980).

Vanhook, A., "Growth of Sugar Crystals, A Review", Sugar Technology Reviews, vol. 8, pp. 41–79 (1981).

Sucrose Crystallinity

TEXTURE EQUILIBRATION IN COOKIES

TECHNICAL FIELD

The present application relates to a process for accelerating texture equilibration in dual-textured crumb-continuous cookies. In particular, texture equilibration is accelerated by increasing the rate of sugar crystallization.

BACKGROUND OF THE INVENTION

Crumb-continuous cookies having a unique storage-stable texture dichotomy, that is crispy on the outside with a chewy interior, have been made by manipulation of sugar crystallization in different parts of the cookie. By making cookies from a plurality of doughs, one containing a crystallization-resistant sugar, and another a conventional readily crystallizable sugar, in such a manner that the two doughs remain segregated in discrete regions within the unbaked cookie, a matrix is formed which can be baked into a cookie having portions which provide a crisp texture and portions which provide a chewy texture. This type of cookie is described in European patent application 31718 of Hong and Brabbs, filed Dec. 23, 1980, and published July 8, 1981, which is herein incorporated by reference. These cookies are manufactured by laminating two or more different doughs employing a variety of lamination techniques.

U.S. Pat. No. 4,344,969 of Youngquist et al., issued Aug. 17, 1982, describes a process for preparing cookies having storage-chewable chewy and crisp textures from a single dough wherein sugar crystallization is controlled by enzyme activity. Manipulation of water activity is one means used for activating and inactivating enzymes in selected portions of the cookie. Thus, sugars and/or starches in the areas where the enzyme is active are converted into mixtures which are noncrystallizing or crystallization-resistant, while the crystallization behavior of sucrose is preserved in those areas where the enzyme is inactive. The resulting dough and subsequent crumb areas of the baked cookie have storage-stable chewy and crisp textures, respectively.

It is known that cookie staling is a sugar crystallization process. For conventional single-texture cookies, the initial crispness just after baking is due to the dry outer surface. During the subsequent 24 hours, the sugar begins to crystallize spontaneously, and water migrates from the interior, where the water activity is relatively high, to the moisture-depleted outer surface. As the sugar crystallizes over time, the cookie becomes harder. Unlike bread staling, these latter changes in a cookie cannot be reversed by heating, indicating that the starch in the cookie is not undergoing retrogradation.

For the dual-textured cookies, sugar crystallization is inhibited in discrete regions of the cookie through use of a crystallization-resistant sugar in those regions, or through use of enzymes. Thus, these cookies do not undergo the typical staling process. Instead, sugar crystallization is allowed to progress only in discrete regions. This allows for controlled localization of crisp regions and chewy regions. The sugar crystallization process in the dual-textured cookies equilibrates the two textures to a storage-stable state. The various regions retain their respective textures providing a highly desirable texture dichotomy.

This type of cookie made by manipulation of sugar crystallization will require tempering prior to reaching textural equilibrium, when the crystallizable sugar is in transition from the amorphous (glass) form to the crystalline form. During this period the outer crisp regions will soften slightly due to the moisture transfer from the interior to the surface, and then become crisp again. The chewy regions can become tough and then become chewy again. A tempering period of two months or more can be required before textural equilibrium is achieved. Thus in the manufacture of this type of dual-textured cookie, the quality of production cannot be certified until after the cookies are stored for the tempering period. This, of course, is uneconomical and inefficient. Clearly, reduction or elimination of this required tempering period for the cookies to reach textural equilibrium would be advantageous.

Accordingly, it is an object of the present invention to provide a process for accelerating texture equilibration in dual-textured crumb-continuous cookies wherein the textures are achieved by manipulation of sugar crystallization.

It is a further object of the invention to provide a process for increasing the rate of sugar crystallization in this type of cookie.

It is a further object of the invention to provide a process for accelerating texture equilibration of this type of cookie through surface rehydration.

It is a further object of this invention to provide a process for accelerating texture equilibration of this type of cookie through variations in sugar particle size.

It is a further object of this invention to provide a process for accelerating texture equilibration of this type of cookie through alterations in the ratio of sugar to flour.

It is a further object of this invention to provide a process for accelerating texture equilibration of this type of cookie through manipulation of the amounts of crystallization-resistant and readily crystallizable sugars.

These and other objects of the invention will be evident from the following disclosure. All percents are by weight unless otherwise indicated.

DISCLOSURE OF THE INVENTION

This invention comprises a process for reducing the time required to achieve texture equilibration in crumb-continuous cookies having distributed therein discrete regions of storage-stable crisp texture and discrete regions of storage-stable chewy texture comprising increasing the rate of sugar crystallization in the outer region of the cookie. The rate of sugar crystallization can be increased by exposing the cookies to an exogenous source of moisture, decreasing the level of crystallization-resistant sugar in the outer region of the cookie, decreasing readily crystallizable sugar particle size for a given sugar level, increasing the readily crystallizable sugar to flour ration, increasing the moisture level in the cookie dough, baking the cookies to have a higher moisture content, or by other equivalent means.

Brief Description of the Drawings

While the specification concludes with claims particularly pointing out and distinctly claiming the subject matter which is regarded as forming the present invention, it is believed that the invention will be better understood from the following description taken in connection with the accompanying drawings. For FIGS.

1-9 all cookies were stored at 70° F. (21° C.). For FIGS. 1-9 the chewy texture is represented in gm.-cm. ×10$^{-2}$ by the symbol ○, and the crisp texture is represented as peaks per cookie by the symbol ●.

DESCRIPTION OF THE PREFERRED EMBODIMENTS

The term "textural equilibrium" is used herein to mean the point at which those physico-chemical and structural features responsible for texture and those physico-chemical and structural processes responsible for changes in texture have reached approximate steady state relative to the expected usable life and storage conditions of the product. Most cookies, for example, will reach their equilibrium textures via processes which are either logarithmic or sigmoidal in their time progression. In such instances, relative infection points and/or time constants will be fairly easy to determine. In all instances, slow long-term processes and texture changes which extend well beyond the maximum usable life of the cookie are ignored.

The term "water activity" is used herein in its usual context to mean the ratio of the fugacity of water in the system being studied to the fugacity of pure water at the same temperature. The water activity of the products and compositions herein can be measured using well-known physical chemical techniques and commercially available instruments. Cookies typically have a water activity of about 0.25 to about 0.80. The preferred cookies of this invention have a water activity of between about 0.4 and about 0.7.

The term "tempering" is used herein to mean holding the packaged cookies within a temperature of from about 60° F. (15° C.) to about 95° F. (35° C.) for a period of time sufficient to achieve equilibration of the textures.

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily available food sugars in this regard, crystallizing spontaneously at water activity levels of from about 0.25 to 0.8 in normal cookie systems. Mixtures of readily crystallizable sugars with other mono- and/or disaccharides, where readily crystallizable sugars comprise over 85% of the total sugar, exhibit crystallization behavior similar to a pure readily crystallizable sugar.

By "crystallization-resistant sugar" is meant a mono- or disaccharide, or mixture of mono- and/or disaccharides, which crystallizes, at the water content and water activity encountered in semi-moist cookies of the home-baked type, substantially more slowly than sucrose under the same conditions, typically remaining uncrystallized for periods of at least one to six months. Particularly good crystallization-resistant sugars are fructose, dextrose, and mixtures of sugars of which fructose and dextrose together comprise at least about 15% by weight, and solutions thereof. Others include psicose, fructose, sorbose, tagatose, allose, altrose, mannose, gulose, idose, galactose, talose, maltose and lactose.

The term "crystallization-resistant sugar" also includes the combination of a readily crystallizable sugar with a sugar crystallization inhibitor.

"Monosaccharides" and "disaccharides" as used herein are compounds well known in the art. Monosaccharides have the emperical formula $(CH_2O)_n$, wherein n is greater than or equal to 3. The carbon skeleton of the common monosaccharides is unbranched and each carbon except one bears an -OH group; the remaining carbon is generally combined in an acetal or ketal linkage. Hexoses, both aldos and ketose forms, straight chain and pyranose or furanose forms, are preferred herein. The ketohexoses include psicose, fructose, sorbose, and tagatose. The aldohexoses include allose, altrose, glucose, mannose, gulose, idose, galactose, and talose.

Disaccharides consist of two monosaccharides joined by a glycosidic linkage. The most common disaccharides are maltose, lactose, and sucrose.

By "fructose" is meant the ketohexose having the straight chain formula

Fructose is a commonly available crystallization-resistant, food-acceptable monosaccharide remaining free of significant crystallization indefinitely under the conditions described herein. Dextrose (glucose) and maltose also exhibit crystallization resistance.

Further, mixtures of readily crystallizable sugars with other sugars, where the readily crystallizable sugar comprise less than 85% of the total sugar mixture exhibit crystallization resistance similar to what would be expected if the entire sugar system were of a crystallization-resistant species. Preferable is 80:20 readily crystallizable to other sugars, and most preferable is 75:25 readily crystallizable sugars to other sugars, which latter mixtures remain uncrystallized essentially indefinitely, compared to the lifetime of the cookie.

In other words, the readily crystallizable sugar is inhibited from crystallizing by the presence of the crystallization-resistant sugar. The delay in crystallization of the readily crystallizable sugar is related to the amount of crystallization-resistant sugar in the mixture. Thus, the relationship between sugar composition and time to complete crystallization is a continuum.

The cookies herein preferably comprise a laminated structure of a plurality of doughs wherein at least one inner dough is substantially enveloped within at least one distinct outer dough. However, other laminated structures are included within the present invention and can be formed by a variety of techniques. In the preferred execution the doughs containing primarily crystallization-resistant sugar will comprise baked cookie regions having a chewy texture, and the doughs containing primarily readily crystallizable sugar will comprise baked cookie regions having a crisp texture. For the laminated structure most preferred, a first or outer dough will contain a greater amount of readily crystallizable sugar surrounding a second or inner dough containing a greater amount of crystallization-resistant sugar.

The present invention comprises a process for accelerating texture equilibration in dual-textured crumb-continuous cookies by increasing the rate of sugar crystallization. During the equilibration period, moisture in these cookies migrates from the middle portion to the outer surface portion of the cookie and back again. The dough balls, comprised of two doughs, enter the oven at about 14% moisture and emerge at about 6% moisture. The water is not, however, evenly distributed throughout the baked cookie. The top and edge are quite dry while the middle retains much of its moisture. This is a nonequilibrium state. The outer regions of the cookie are too dry, and water migrates from the middle portion to rehydrate them. The amorphous form of readily crystallizable sugar is hygroscopic and thermodynamically unstable and will crystallize if enough water is present. If enough water can be absorbed, the viscosity of the sugar glass will be reduced imparting enough mobility to the sugar molecules to permit crystallization. This combination of events accounts for the rapid increase in moisture of the surface and edge of the cookie and decrease in moisture of the middle of the cookie during the first several days of equilibration.

The loss of moisture from the middle portion during equilibration results in a 2 to 3% drop in moisture which translates into a drop in the amount of water available to the crystallization-resistant sugar and other hydrophilic components of the inner dough. The increase in viscosity caused by this change is substantial and is responsible for the tough eating quality of the middle portion of the cookie during the tempering period. The inner cookie increases in toughness with a decrease in water.

As the readily crystallizable sugar crystallizes, the outer region of the cookie becomes less hygroscopic, and therefore some water in the outer portion of the cookie is released and migrates back into the middle of the cookie, acting as a plasticiser and therefore lowering the viscosity and corresponding toughness of the middle portion. The crystallization of the readily crystallizable sugar causes the crisping of the outer portion, resulting in the dichotomous eating quality of the tempered cookie.

During texture equilibration in the first portion of the tempering period the moisture of the cookie edge starts very low after making (about 2 to 3%) and within 4 to 5 days approaches a much higher level (about 5%). This moisture then very slowly drops back toward an equilibrium value of about 4 to 4.5%. During the same period, the middle portion of the cookie goes through a reverse process, starting with a high moisture level of about 9 to 10%, dropping rapidly during the first 4 or 5 days to about 7 to 8% or lower, and slowly over a period of weeks, returning to the 8 to 8.5% range if enough moisture is present. The top and bottom of the cookie behave similar to the edges but not to such an extreme. All three outer portions of the cookie, top, edge and bottom, appear to approach the same final equilibrium point.

This moisture equilibration process can be monitored by means of measurements of water activity. The water activity of the cookie edges starts at a value quite low, while the water activity of the middle portion of the cookie is relatively high. The two values approach the same equilibrium value. Cookies with a higher overall moisture content equilibrate at a higher water activity.

Since the sugar crystallization in the outer portion of the cookie causes the crisping of the outer portion and results in the textural dichotomy, acceleration of the rate of sugar crystallization accelerates the rate of reaching textural equilibrium. In the process of the present invention, any suitable means for increasing the rate of sugar crystallization can be employed. For example, increasing the mobility of the readily crystallizable sugar in the amorphous state will increase the rate of its diffusion to a nucleation site for crystallization. Likewise, a reduction in the distance necessary for readily crystallizable sugar molecules to diffuse, i.e., the diffusional path length, to reach a nucleation site will increase the rate of crystallization.

One method for increasing the rate of sugar crystallization in dual-textured crumb-continuous cookies to accelerate texture equilibration comprises exposing the cookie to an exogenous source of moisture to rehydrate the cookie surface after baking. Steaming of the cookie surface immediately after baking is one suitable means for exposing the cookie to an exogenous source of moisture. Another is the injection of moisture into a closed receptacle containing the cookies. A third comprises mere exposure of the cookies to a high humidity environment, i.e., an environment with a humidity level higher than the moisture level of the cookie surface. Other equivalent techniques can be employed. After baking, the cookie surface is very dehydrated and as the cookie cools, the readily crystallizable sugar becomes immobilized and little crystallization occurs. As moisture migrates from the cookie interior to the surface, more water becomes available to break the hydrogen bonds in the amorphous matrix, thereby increasing the mobility of the readily crystallizable sugar. Increasing the surface moisture externally rather than relying on endogenous moisture transfer accelerates crystallization. Thus, rehydration of the cookie surface is one means to accelerate sugar crystallization and thereby decrease the time required for this type of cookie to reach textural equilibrium. An additional advantage of post-bake rehydration is that the product can be baked longer with greater flavor generation and afterwards sugar can occur during baking resulting in a decrease in nucleation sites.

The following table from Matz, S. A. and Matz, T. D., *Cookie and Cracker Technology*, 2nd Ed., AVI Publishing Co., Inc., Westport, CT, page 37 (1978), lists typical screen analysis of readily crystallizable sugars commonly available commercially.

TABLE A

| Tyler Screen, % on Mesh | U.S. Screen, % on Mesh | Confectioners AA or Medium Granulated | Sanding | Bottlers', Manufacturers or Fine Granulated | Standard Granulated or Extra-Fine Granulated | Bakers' Special or Fruit Granulated | Standard Powdered or 6X | Extra-Fine Powdered or 10X | Fondant and Icing | Dehydrated Fondant, Drivert or Dri-Fond |
|---|---|---|---|---|---|---|---|---|---|---|
| 8 | 8 | | | | | | | | | |
| 10 | 10 | 5.6 | | | | | | | | |
| 14 | 16 | 59.0 | | | | | | | | |
| 20 | 20 | 27.4 | 9.3 | Trace | Trace | | | | | |
| 28 | 30 | 7.4 | 49.2 | 4.3 | 0.1 | Trace | | | | |
| 35 | 40 | 0.4 | 37.6 | 74.5 | 13.8 | 0.4 | | | | |
| 48 | 50 | | 3.3 | 18.6 | 40.2 | 1.7 | | | | |
| 80 | 80 | | 0.3 | 2.3 | 40.6 | 24.8 | | | | |
| 100 | 100 | | | | | 32.2 | 0.3 | 0.1 | | |
| 250 | 140 | | | | | 31.6 | 1.8 | 1.4 | | |
| 200 | 200 | | | | | | 6.6 | 2.4 | | |
| 270 | 270 | | | | | | 8.2 | 3.0 | | |
| 325 | 325 | | | | | | 10.8 | 7.0 | | |
| Through last sieve | | 0.2 | 0.3 | 0.3 | 5.0 | 9.2 | 72.3 | 86.1 | 99.0[1] | 99.0[1] |

[1]The extremely fine grain size of fondant and icing sugar makes the regular screen analysis impractical. However, practically all particles will pass through a 325 Mesh standard sieve having 0.0043 cm openings. The average particle size of fondant and icing sugar is about 20 u, i.e., 0.0020 cm.

adjusted to the proper moisture level to enhance texture equilibration.

A second process for accelerating texture equilibration in dual-textured crumb-continuous cookies comprises increasing the rate of sugar crystallization by decreasing the level of crystallization-resistant sugar present in the outer region of the cookie. The crystallization-resistant sugar reduces the mobility of the readily crystallizable sugar, in the amorphous (glass) state, thereby reducing the rate of its diffusion to the nucleation site for crystallization. Thus, decreasing the level of crystallization-resistant sugar in the dough for the outer region of the cookie increases the rate of readily crystallizable sugar diffusion and crystallization. The level of crystallization-resistant sugar can be reduced to 0% by weight so that none is present in the outer region of the cookie.

A third process for accelerating texture equilibration in dual-textured crumb-continuous cookies comprises increasing sugar crystallization by decreasing the particle size of the readily crystallizable sugar. It is known in the art that only sucrose crystals are effective nucleating agents for sucrose crystallization. Very few other materials are capable of acting as heterogeneous nucleating agents for sucrose. Also, under limited mobility situations homogenous nucleation is very difficult and unlikely. It is believed that sucrose crystals in the dough that do not dissolve during baking act as nuclei for further crystallization. Use of sucrose with a smaller particle size can increase the density of sucrose crystals which survive baking, thereby reducing the average distance that non-crystalline sucrose must diffuse to reach a nucleation site. Reduction of this diffusional path length increases the rate of sucrose crystallization and accelerates texture equilibration. However, readily crystallizable sugar particle size must be optimized. If the particle size is too small, total dissolution of the It has been found that readily crystallizable sugar having a particle size of Confectioners AA through Baker's Special is suitable for increasing the rate of sugar crystallization as particle size decreases. The use of Standard Powdered 6× or smaller particle sizes has been found to not effectively increase the rate of crystallization. Readily crystallizable sugar having the particle size of Standard Granulated wherein at least about 40% by weight remains on a U.S. Screen Mesh of 80 is preferred for use herein. Readily crystallizable sugar having the particle size of Baker's Special wherein at least about 30% by weight remains on a U.S. Screen Mesh of 100 is most preferred for use in the process of the present invention.

A fourth process for accelerating texture equilibration in dual-textured crumb-continuous cookies comprises increasing the rate of sugar crystallization by increasing the readily crystallizable sugar to flour ratio in the dough forming the outer regions of the baked cookie. A readily crystallizable sugar to flour ratio up to about 1.3:1 is suitable for use herein. A preferred ratio is about 1.1:1. This technique also increases the density of readily crystallizable sugar crystals which survive baking, thereby reducing the average distance that non-crystalline sugar must diffuse to reach a nucleation site. Reduction of this diffusional path length increases the rate of sugar crystallization and accelerates texture equilibration.

A fifth process for accelerating texture equilibration in dual-textured crumb-continuous cookies comprises increasing the overall moisture level in the dough for the inner regions of the cookie. The moisture level preferably is increased in the dough containing a higher level of crystallization-resistant sugar. The moisture level can be varied over a range of about 5.5% by weight. Preferably, it is varied over a range of about 2% by weight. If the moisture level is increased in the dough containing a higher level of readily crystallizable sugar, i.e. the dough for the outer regions of the cookie, more readily crystallizable sugar can dissolve during baking thereby decreasing nucleations sites.

A sixth process for accelerating texture equilibrium in dual-textured crumb-continuous cookies comprises baking the cookies to a higher moisture endpoint. Thus, the cookies would be baked for a shorter time, or at a lower temperature, or both, or under other conditions ascertainable to those skilled in the art, so that the baked cookie would have a higher overall moisture content. The moisture content of the baked cookie can be varied over a range of about 5.5% by weight. Preferably, it is varied over a range of about 2% by weight.

For dual-textured cookies made by manipulation of sugar crystallization, a tempering period of two months or more can be required before textural equilibrium is achieved. Increasing the rate of sugar crystallization accelerates texture equilibration. Use of the above-described processes for increasing the rate of sugar crystallization can decrease equilibration time to less than about 21 days, often less than about 15 days. Use of a combination of the techniques simultaneously can reduce tempering time to about 11 days or less.

It can be appreciated that still other embodiments or executions of this invention can be devised without departing from its scope and spirit and without losing its advantages. In particular, increasing the rate of sugar crystallization, however practiced, accelerates texture equilibration in dual-textured crumb-continuous cookies.

TESTING AND EVALUATION

The following test methods were employed to analyze cookies described herein.

A. Diameter and Thickness

Cookie diameter was measured using a linear gauge comprising a ruler with an elevated edge along one side and end, and a plastic block which forms the other end and slides horizontally along the gauge. Eight cookies were placed edge to edge on the gauge surface. The cookies were arranged to touch each other as well as the elevated side and end of the gauge. The plastic block was placed at the edge of the eighth cookie, and the gauge read to the nearest 0.01 inch. All cookies were rotated 90° and the measurement repeated. The average of the two measurements was divided by eight to obtain average cookie diameter.

Eight cookies were placed on edge with the tops facing in the same direction in the cookie gauge used for the diameter measurement. The plastic block was placed touching the last cookie in the row and the gauge read to the nearest 0.01 inch. The reading was divided by eight to obtain average cookie thickness.

B. Moisture

Moisture of the cookies was determined by a standard vacuum oven technique. A weighed sample was heated at 70° C. at 28 inches of Hg for 17 hours. The weight loss was calculated and reported as percent moisture.

C. Color

A MacBeth Color Meter System Model 1500 was used to measure the L, a, and b colors of the cookies. MacBeth reference standards and calibration plates were employed. The values are units of light reflectance measurement or luminosity, and the higher the value is the lighter the color is since a lighter colored material reflects more light. In particular, the "L" scale contains 100 equal units of division. Absolute black is at the bottom of the scale (L=0), and absolute white is at the top of the scale (L=100). The "a" scale measures color hue and chroma between red and green. The "b" scale measures color hue and chroma between blue and yellow. Hue is analogous to the dominant wavelength, while chroma relates to the color purity.

For each cookie, two measurements are taken. One measurement is taken at the edge and one at the center of the cookie. The cookie must be free of chips or exposed particles at the areas where the measurements are taken. After the instrument is calibrated, the top center of the cookie is centered in the viewport and the reading recorded. The cookie edge is then adjusted to cover the viewport and the reading recorded. For each analysis eight cookies are measured. The average L, a, and b values for the eight cookies (sixteen measurements) are reported.

D. Water Activity

The water activity of the cookies was measured using a Kaymont/Rotronic Hygroskop Water Activity Meter Model D2200, available from Kaymont Instrument Corporation, P.O. Box 348, Huntington Station, New York 11746. The meter measures the relative humidity of the headspace contained between the cookie surface and a sensor in a sampling chamber kept at a constant temperature of $\lambda°$ F.$\pm 1°$ F. (27° C). The headspace relative humidity is an indication of the water activity of the sample which has been allowed to equilibrate with the environment in the sample chamber.

The instrument is calibrated using standards available from Kaymont. A sample is removed from the center of a cookie using a 14 mm cork boring tool. The sample is sliced in half horizontally. Both halves are placed side by said in the sample cup and placed in the instrument chamber. The chamber is sealed and the relative humidity, temperature, and water activity recorded after 2 minutes.

E. Texture

An Instron Model 1130 Universal Testing Machine, available from Instron Corporation, 100 N. Royall, Canton, Mass. 02021, was used to measure the chewy and crisp textures in the cookies. The force required for a probe to penetrate the cookie a specific distance is measured. The Instron was equipped with a probe in the shape of a thin knife blade 0.062 inch thick with a 30° taper to a sharp edge having a width that exceeds the diameter of the cookie to be measured.

Chewiness is instrumentally determined by recording the energy input, or the area under a plot of instantaneous force exerted versus probe distance into the cookie. The amount of force required to break through the cookie is integrated over distance or time. A low energy input represents a tender chewy cookie texture, while a high energy input represents a tough cookie texture. Typically, for dual-textured cookies the area is from about 5 to about 10 gm./cm.$\times 10^{-2}$. Crispness is instrumentally determined by counting the number of small, local peaks during the probe penetration. A peak represents a sudden release of force which occurs due to the fracturing of the crust or crumb. A high number of peaks means more fracturing and more crispness. A low number of peaks represents little fracturing and less crispness. Dual-textured cookies of optimum crispness usually exhibit greater than three peaks per cookie.

The test equipment is set up as follows: An Instron Universal Testing machine is fitted with a probe mounted on the Instron crosshead perpendicular to a load cell, which rests on the base of the Instron.

The cookie is placed on the load cell, beneath the probe. The instron is set to read 5 kg. full scale. The output of the Instron is recorded and analyzed by a computer. The probe penetrates the immobilized cookie downwardly at a speed of 20 mm./min. (0.8 in./min.). Penetration is carried entirely through the cookie.

In conduct of the tests, the cookie sample is positioned on the load cell so as to align the probe with the desired sample site. The Instron crosshead is lowered manually to within less than one mm. above the top of the sample surface, and the penetration is conducted. After the penetration test for the cookie is completed, the crosshead is raised and the sample pieces are removed so that the probe and load cell can be cleaned.

In analyzing the output curves from the penetration tests, it should be understood that, occasionally, aberrant results will be obtained. Cookies will occasionally disintegrate, inclusions will be contacted by the probe, voids will be encountered, etc. It must be emphasized that the data are best understood when taken cumulatively, as averages over several test runs, preferably a minimum of 20 cookies per test, and obviously aberrant runs should be discarded. In addition, unless equipment is available to automate processing of the curves, judgment will be required in ascertaining inflection points, integrated areas, and the like.

F. Degree of Sucrose Crystallinity

A Philips XRG 3100 x-ray diffractometer, available from Philips Electronic Instruments, Inc., 85 McKee Drive, Mahwah, N.J. 07430, equipped with a wide range Goniometer and a copper radiation source was used to measure sucrose crystallization in the cookies. Diffraction patterns were recorded on a strip chart recorder.

X-ray diffraction is sensitive only to crystalline sucrose, so by comparing the response of a sample to the response of a fully crystallized control, the degree of sucrose crystallinity can be determined.

Cookie samples are first extracted with hexane to remove the fat, and then freeze dried to remove the water. Samples are then ground to a fine powder using a mortar and pestle. A portion of this material is packed into a sample holder, mounted in the diffractometer and scanned from $2\theta = 6°$ to $30°$. A fully crystallized control cookie is also analyzed in the same manner.

Peak heights for sucrose diffraction lines at $2\theta = 11.7°$, $12.8°$, $13.2°$, $18.7°$, $19.5°$, and $24.7°$ are measured using the standard baseline technique for both the sample and the control cookies. A sample-to-control intensity ratio is created for each of the six lines. These six ratios are then averaged to generate a single ratio representing the degree of sucrose crystallization in the sample cookie.

INDUSTRIAL APPLICABILITY

The following embodiments illustrate the practice of this invention, but are not intended to limit it. All percents are by weight unless otherwise stated.

EXAMPLE 1

| Ingredients | Percent by Weight |
|---|---|
| First Dough | |
| Hydrogenated vegetable shortening | 16.5 |
| Sugar | 30.4 |
| High fructose corn syrup | 6.0 |
| Flour | 37.3 |
| Flavor and minor ingredients | 1.0 |
| Water | 8.8 |
| Second Dough | |
| Hydrogenated vegetable shortening | 15.5 |
| Sugar | 9.5 |
| High fructose corn syrup | 26.4 |
| Flour | 24.6 |
| Flavor and minor ingredients | 3.7 |
| Chocolate chips | 20.3 |

The first dough was formed in the following manner. The baking soda was dissolved in the water and combined with the flavor, molasses, and high fructose corn syrup. The shortening was added. Half of the sugar was mixed in, the flour and minot ingredients were added and mixed, and the remainder of the sugar added and mixed.

The second dough was prepared by first mixing the high fructose corn syrup, flavor, and baking soda. The shortening was added. Half of the sugar was mixed in, the flour and minor ingredients added and mixed, and the remainder of the sugar was added and mixed. Finally the chocolate chips were mixed in.

The doughs were then fed into a Rheon encrusting machine, Model 207, available from Rheon USA of Paramus, New Jersey. The two doughs were coextruded simultaneously via the encrusting machine. The first dough was wrapped around the second dough and formed into individual dough balls by an encrusting disc. The dough pieces were then repositioned to provide proper alignment for baking. The dough pieces were then transferred to an oven band and baked in a Middleby-Marshall oven at 305° F. (152° C.) for about 8 minutes. After cooling, the cookies were sealed into containers and stored at 70° F. (21° C.). The cookies were analyzed for diameter, thickness, moisture, color, water activity, degree of sucrose crystallinity, and texture using the methods previously described. Data are summarized in Table I and FIGS. 1 and 2.

TABLE 1

| | |
|---|---|
| Diameter, cm | 5.44 |
| Thickness, cm | 0.97 |
| Moisture, % | 5.9 |
| Color | |
| L | 48.2 |
| a | 11.1 |
| b | 11.1 |
| $A_w$ (80° F.) (27° C.) | 0.48 |

Figure 1:
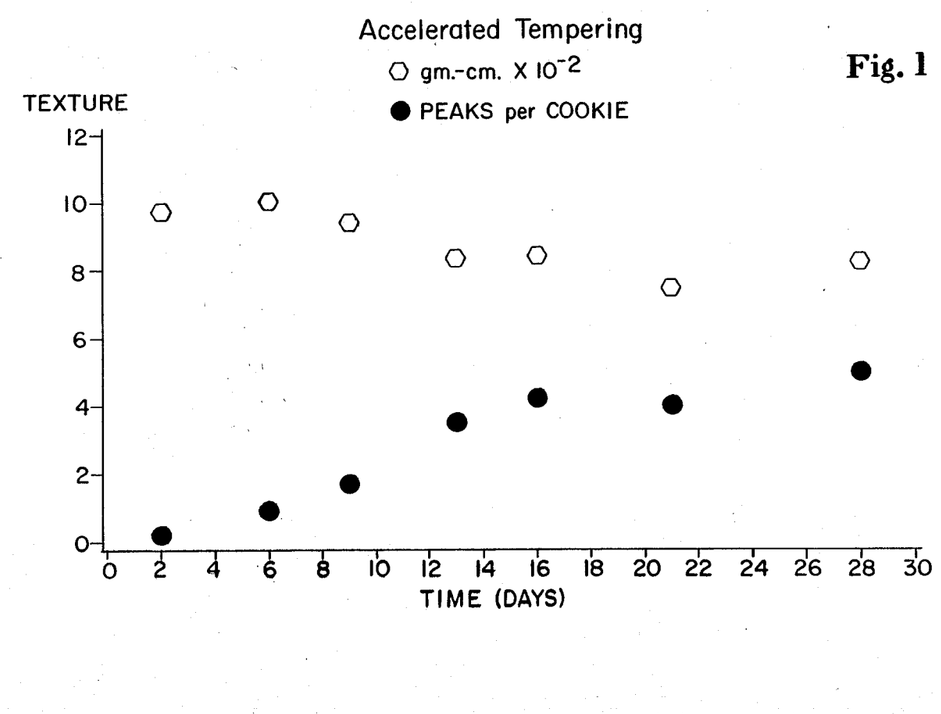
FIG. 1 is a graph of the chewy and crisp cookie textures versus days of tempering for cookies prepared from a control formulation having sugar in the outer regions of the cookie which is primarily readily crystallizable and crystallization-resistant sugar in the inner regions of the cookie.
Figure 2:
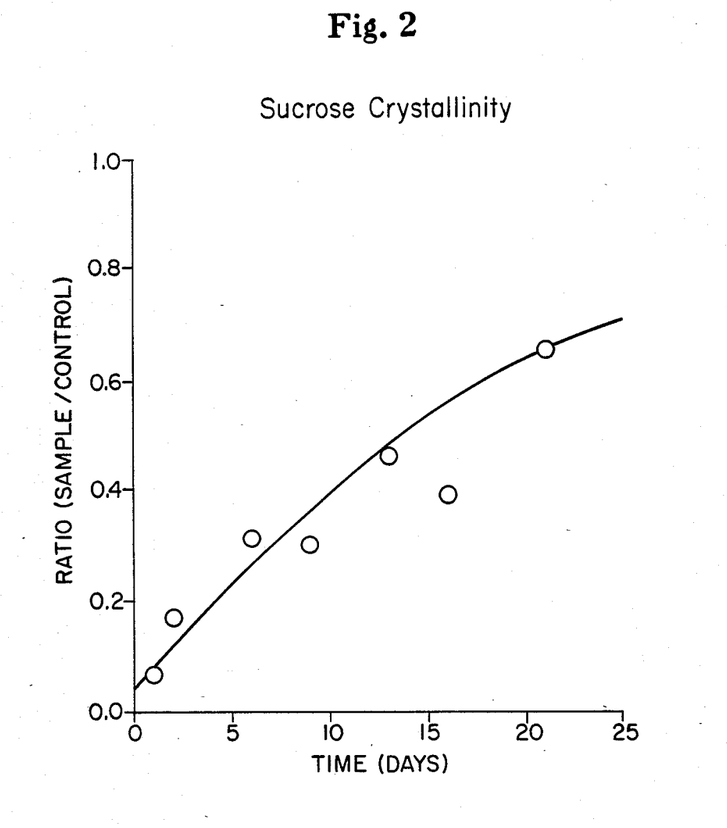
FIG. 2 is a graph of the degree of sucrose crystallinity versus days of tempering for the same cookies as shown in FIG. 1.

FIG. 1 represents a graph of the two textures of the cookie over several days of tempering. Texture measurements were made periodically from the second o the twenty-eighth day of tempering. The chewy texture (or toughness) is represented by the symbol ◯. The crisp texture is represented by the symbol ●. FIG. 2 represents a graph of the degree f sucrose crystallinity in the cookie over several days of tempering. As can be seen from FIGS. 1 and 2, about 21 days were required for the two textures, and sucrose crystallization, to reach equilibrium.

EXAMPLE 2

| Ingredients | Percent by Weight |
|---|---|
| First Dough | |
| Hydrogenated vegetable shortening | 16.5 |
| Sugar | 30.4 |
| High fructose corn syrup | 6.0 |
| Flour | 37.3 |
| Flavor and minor ingredients | 1.0 |
| Water | 8.8 |
| Second Dough | |
| Hydrogenated vegetable shortening | 15.5 |
| Sugar | 9.5 |
| High fructose corn syrup | 26.4 |
| Flour | 24.6 |
| Flavor and minor ingredients | 3.7 |
| Chocolate chips | 20.3 |

The doughs were prepared as in Example 1. The doughs were then separately manually fed into the two distinct hoppers of a co-extrusion machine, Model No. DDP 200-9005, available from Bepex Hutt GmbH, Postfach 9, Daimlerstrasse 9, D-7105 Leingarten, West Germany. The dough was fed through the machine via feed rolls and extruded through a nozzle onto a conveyor belt. The extruder formed the doughs into continuous concentric cylinders such that the second dough was surrounded by an outer layer of the first dough. The dough cylinder was then cut into individual dough cookie preforms so that the outer dough layer was smeared across he inner dough which would have been exposed by the cutting process. The cookie preforms were pillow-shaped rectangular pieces with the second dough enrobed in a nonuniform layer of first dough. The preforms were then repositioned to provide proper alignment for rolling. The preforms were rolled to substantially hemispherical shape using an orbiting cup device. The second dough was substantially uniformly enrobed within an outer layer of first dough. An orbiting cup device having a platen of several cavity units, each having a hemispherical interior and hexagonal exterior, with a depth of 0.75 inch (1.9 cm.) rotating at about 105 rpm rolled several dough preforms simultaneously and smeared the top surface of the outer layer of dough to increase the visibility of or to expose the chocolate chips in the inner dough. Arresting the orbiting motion at a predetermined position provided correct placement of the preform on the discharge belt. The rolled preforms were transferred to an oven band and baked for about 8.5 minutes in a recirculating indirect gas-fired oven. The upper zones were maintained at a temperature of 330° F.±10° F. (165.5° C.±5.5° C.) and the bottom zones were maintained at a temperature of about 280° F.±5° F. (137.8° C.±2.8 C.).

A portion of the cookies were then exposed to steam within 15 minutes of their exit from the oven. These cookies were removed from the oven band onto a screen. The screen and cookies were suspended in a closed container above boiling water for about 25 seconds. The steam-treated and untreated cookies were then separately stored in closed containers and tempered for 22 days at 70° F. (21° C.) with texture measurements taken periodically. The cookies were analyzed for moisture and water activity after texture equilibration. The steam treatment reduced the chewiness (toughness) values while increasing crispness measurements. This correlates with an increase in sucrose crystallization. Data are summarized in Table II.

TABLE II

| | No Treatment | Steam Treatment |
|---|---|---|
| Moisture % | 5.1 | 6.3 |
| $A_w$ (80° F.) (27° C.) | 0.40 | 0.55 |
| Toughness | | |
| 8 days | 25.6 | 7.5 |
| 14 days | 21.5 | 6.9 |
| 22 days | 25.7 | 8.8 |
| Crispness | | |
| 8 days | 0 | 3.4 |
| 14 days | 0.5 | 6.9 |
| 22 days | 0 | 5.8 |

EXAMPLE 3

Cookies were prepared using the formula of Example I, except that no high fructose corn syrup was added to the first dough. The first dough formula was as follows:

| Ingredients | Percent by Weight |
|---|---|
| First Dough | |
| Hydrogenated vegetable shortening | 17.3 |
| Sugar | 31.8 |
| Flour | 39.1 |
| Flavor and minor ingredients | 2.6 |
| Water | 9.2 |

Doughs were prepared and the cookies were formed, baked, tempered and analyzed as in Example 1. Data are summarized in Table III and FIGS. 3 and 4.

TABLE III

| Diameter, cm | 5.11 |
|---|---|
| Thickness, cm | 1.14 |
| Moisture, % | 5.85 |
| Color | |
| L | 52.6 |
| a | 10.3 |
| b | 11.5 |
| $A_w$ (80° F.) (27° C.) | 0.47 |

Figure 3:
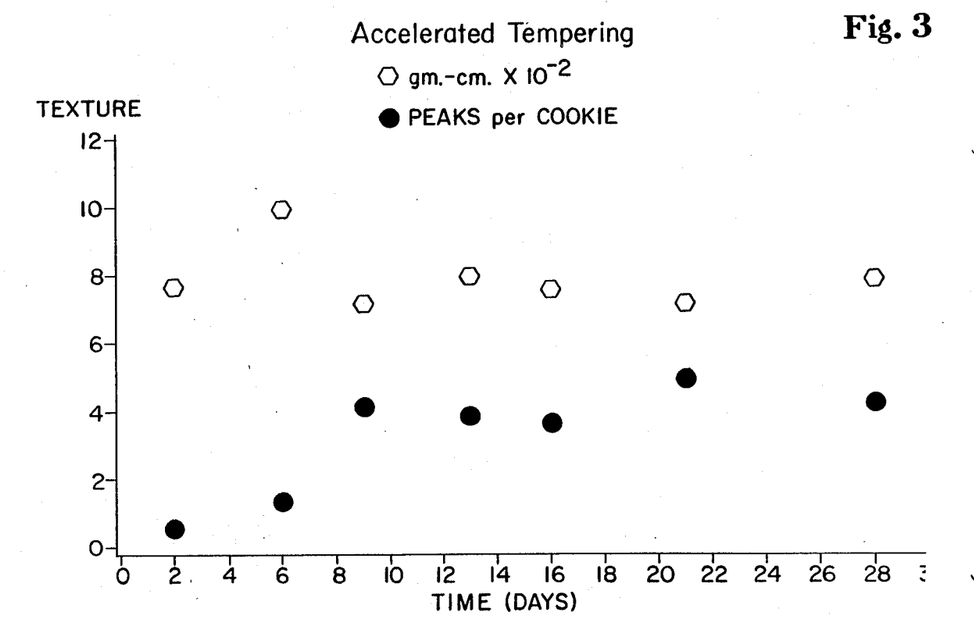
FIG. 3 is a graph of the chewy and crisp cookie textures versus days of tempering for cookies containing no crystallization-resistant sugar in the outer regions of the cookie.
Figure 4:
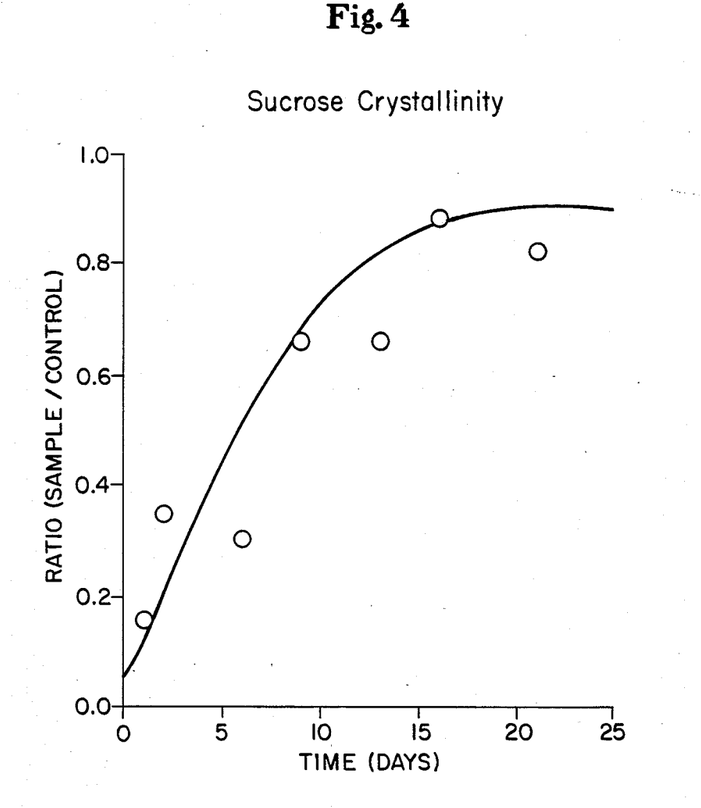
FIG. 4 is a graph of the degree of sucrose crystallinity versus days of tempering for the same cookies as shown in FIG. 3.

FIG. 3 represents a graph of the two textures of the cookies over several days of tempering. FIG. 4 represents a graph of the degree of sucrose crystallinity over several days of tempering. As can be seen from FIGS. 3 and 4, the two textures equilibrated and sucrose crystallization was complete in about 9 to 15 days, a reduction from the 21 days required by the cookies of Example 1.

EXAMPLE 4

Cookies were prepared using the formula of Example I, except that sugar of smaller particle size was employed in the first dough. The particle size distribution of sugar used is described in Table IV-A.

TABLE IV-A

| Tyler Screen % on Mesh | US Screen, % on Mesh | Example I Sugar, Fine Granulated | Example IV Sugar, Baker's Special |
|---|---|---|---|
| 20 | 20 | Trace | — |
| 28 | 30 | 4.3 | Trace |
| 35 | 40 | 74.5 | 0.4 |
| 48 | 50 | 18.6 | 1.7 |
| 80 | 80 | 2.3 | 24.8 |
| 100 | 100 | | 32.2 |
| 150 | 140 | | 31.6 |

Doughs were prepared and the cookies were formed, baked, tempered and analyzed as in Example I. Data are summarized in Table IV-B and FIGS. 5 and 6.

TABLE IV-B

| Diameter, cm | 5.31 |
|---|---|
| Thickness, cm | 1.04 |
| Moisture, % | 6.35 |
| Color | |
| L | 47.5 |
| a | 11.2 |
| b | 10.9 |
| $A_w$ (80° F.) (27° C.) | 0.47 |

Figure 5:
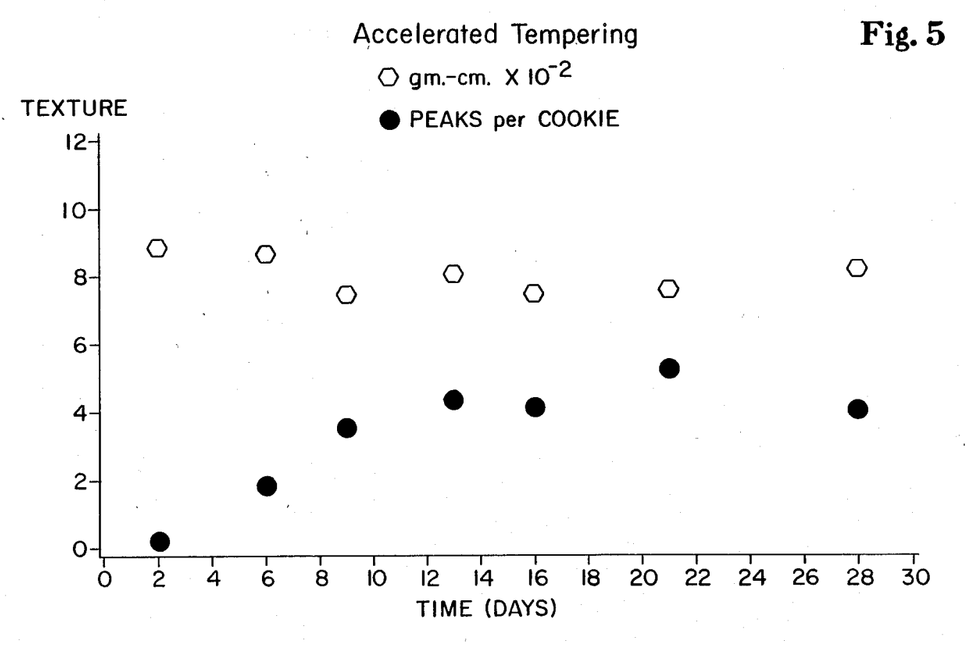
FIG. 5 is a graph of the chewy and crisp cookie textures versus days of tempering for cookies prepared from a formulation containing readily crystallizable sugar of smaller particle size than the control formation in the outer regions of the cookie.
Figure 6:
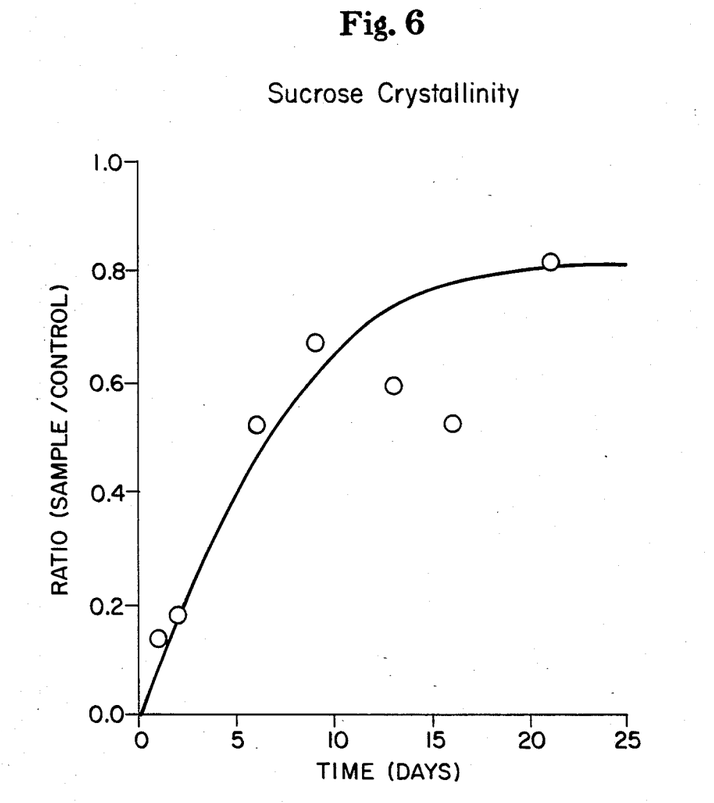
FIG. 6 is a graph of the degree of sucrose crystallinity versus days of tempering for the same cookies as shown in FIG. 5.

FIG. 5 represents a graph of the two textures of the cookies over several days of tempering. FIG. 6 represents a graph of the degree of sucrose crystallinity over several days of tempering. The two textures equilibrated and sucrose crystallization was complete in about 13 to 15 days, a reduction from the 21 days required by the cookies of Example I.

EXAMPLE 5

Cookies were prepared using the second dough formula of Example I and the following formula for the first dough.

| Ingredients | Percent by Weight |
|---|---|
| First Dough | |
| Hydrogenated vegetable shortening | 16.5 |
| Sugar | 35.5 |
| High fructose corn syrup | 6.0 |
| Flour | 32.2 |
| Flavor and minor ingredients | 1.0 |
| Water | 8.8 |

Due to an increase in the level of sugar, the sugar-to-flour ratio for the above formula is 1.1 to 1, compared to 0.8 to 1 for the formula of Example I. The doughs were prepared and the cookies were formed, baked, tempered and analyzed as in Example I. Data are summarized in Table V and FIGS. 7 and 8.

TABLE V

| Diameter, cm | 5.97 |
|---|---|
| Thickness, cm | 0.94 |
| Moisture, % | 5.6 |
| Color | |
| L | 44.2 |
| a | 11.5 |
| b | 10.4 |
| $A_w$ (80° F.) (27° C.) | 0.48 |

Figure 7:
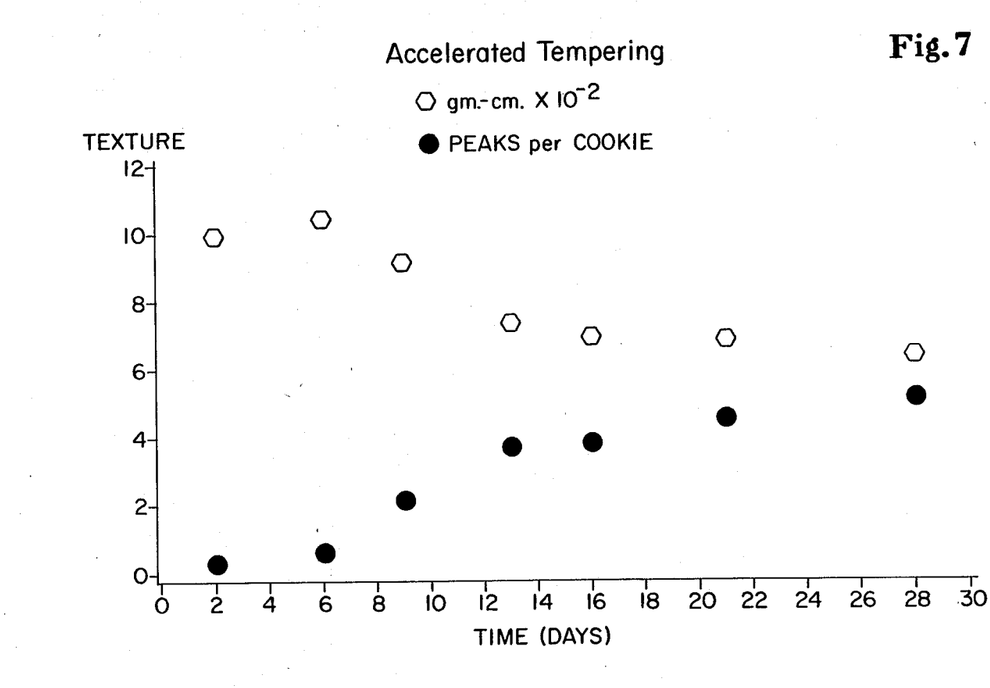
FIG. 7 is a graph of the chewy and crisp cookie textures versus days of tempering for cookies prepared from a formulation containing a higher readily crystallizable sugar to flour ratio than the control formation in the outer regions of the cookie.
Figure 8:
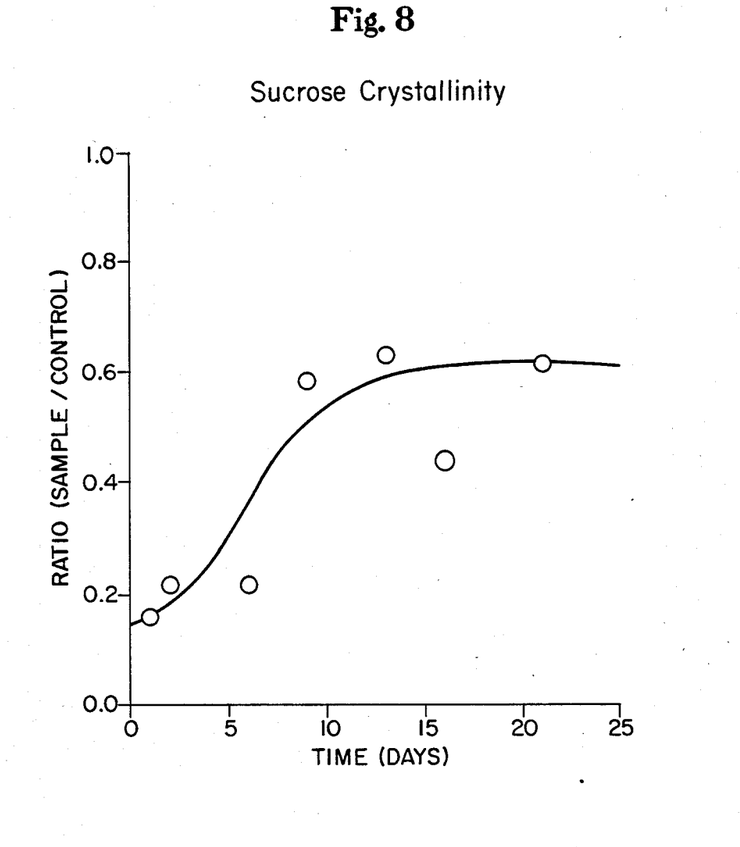
FIG. 8 is a graph of the degree of sucrose crystallinity versus days of tempering for the same cookies as shown in FIG. 7.

FIG. 7 represents a graph of the two textures of the cookies over several days of tempering. FIG. 8 represents a graph of the degree of sucrose crystallinity over several days of tempering. The tow textures equilibrated and sucrose crystallization was complete in about 13 days, a reduction from the 21 days required by the cookies of Example 1.

EXAMPLE 6

Cookies were prepared using the second dough formula of Example I and the following formula for the first dough.

| Ingredients | Percent by Weight |
|---|---|
| First Dough | |
| Hydrogenated vegetable shortening | 17.3 |
| Sugar | 37.1 |
| Flour | 33.8 |
| Flavor and minor ingredients | 2.6 |
| Water | 9.2 |

No high fructose corn syrup was used in this first dough formulation. The smaller particle size Baker's Special sugar as described in Example IV was used with a sugar-to-flour ratio of 1.1 to 1. Thus the individual factors known to decrease texture equilibration time were combined. The doughs were prepared and the cookies were formed, baked, tempered and analyzed as in Example I. Data are summarized in Table VI and FIG. 9.

TABLE VI

| Diameter, cm | 5.44 |
|---|---|
| Thickness, cm | 1.02 |
| Moisture, % | 6.1 |
| Color | |
| L | 48.0 |
| a | 9.8 |
| b | 10.3 |
| $A_w$ (80° F.) (27° C.) | 0.53 |

Figure 9:
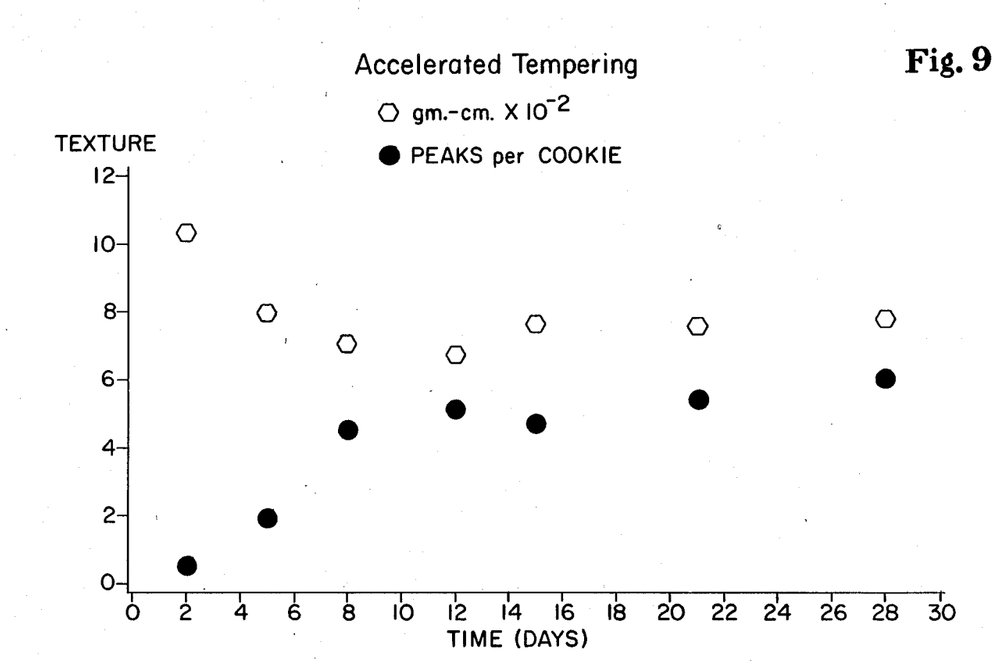
FIG. 9 is a graph of the chewy and crisp cookie textures versus days of tempering for cookies prepared from a formulation containing no crystallization-resistant sugar, reduced particle size readily crystallizable sugar, and a higher readily crystallizable sugar to flour ration than the control formulation in the outer regions of the cookie.

FIG. 9 represents a graph of the two textures of the cookies over several days of tempering. The two textures equilibrated in about 11 days, a reduction from the 21 days required by the cookies of Example I.

What is claimed is:

1. A process for accelerating texture equilibration in crumb-continuous cookies having distributed therein a discrete outer region of storage-stable crisp texture comprising sugar and starch and at least one discrete substantially enrobed inner region of storage-stable chewy texture comprising increasing the rate of sugar crystallization in the outer region of the cookie by exposing the baked cookie to an exogenous source of moisture to rehydrate the cookie surface, said sugar in said discrete outer region comprising at least about 85% sucrose by weight and said outer region having a sucrose to flour ratio of at least about 1.1:1.

2. The process of claim 1 wherein the rehydration is by steaming of the cookie surface after baking.

3. The process of claim 1 wherein the rehydration is by addition of moisture to a closed receptacle containing the cookies.

* * * * *

UNITED STATES PATENT AND TRADEMARK OFFICE
CERTIFICATE OF CORRECTION

PATENT NO. : 4,892,745

DATED : Jan. 9, 1990

INVENTOR(S) : Dennis R. Gage; Martin A. Mishkin

It is certified that error appears in the above-identified patent and that said Letters Patent is hereby corrected as shown below:

Column 1, line 33: "-chewable" should read -- -stable --
Column 3, line 42: "ration" should read --ratio--
Column 10, line 31: "$\lambda°F.$" should read --80°F.--
Column 10, line 38: "said" should read --side--
Column 10, line 62: "about5" should read --about 5--
Column 13, line 1: "degree f" should read --degree of--
Column 13, line 40: "across he" should read --across the--

Signed and Sealed this

Thirtieth Day of June, 1992

*Attest:*

DOUGLAS B. COMER

*Attesting Officer*  *Acting Commissioner of Patents and Trademarks*